A. W. EPRIGHT.
CAR WEIGHING APPARATUS.
APPLICATION FILED JULY 27, 1909.
956,323.
Patented Apr. 26, 1910.
4 SHEETS—SHEET 1.
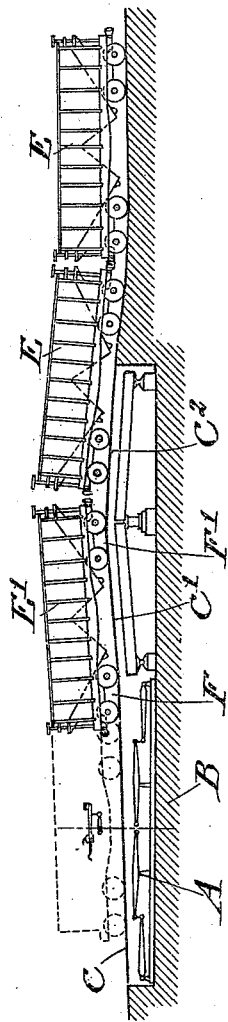
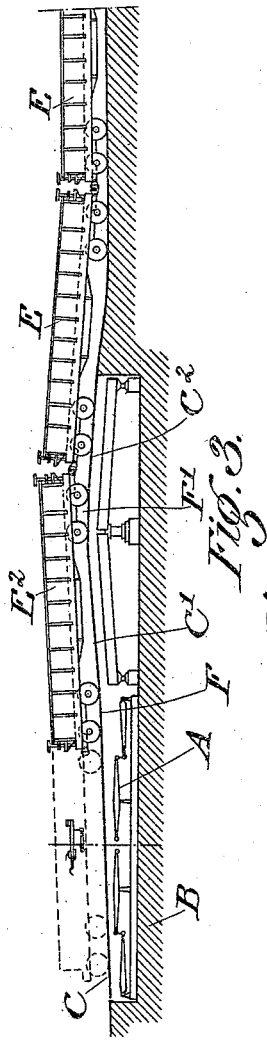
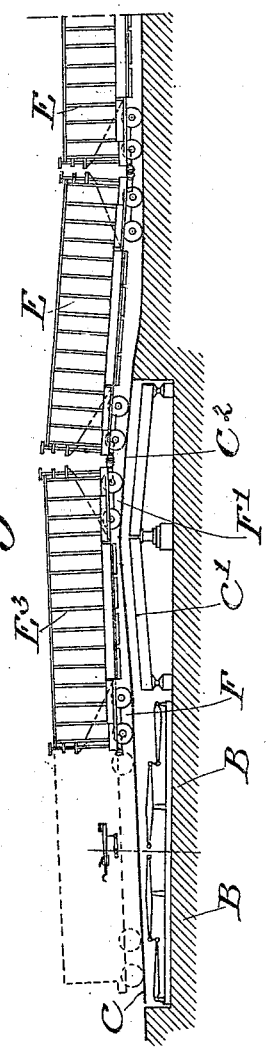
WITNESSES:
INVENTOR
Alonzo W. Epright
BY
ATTORNEY.

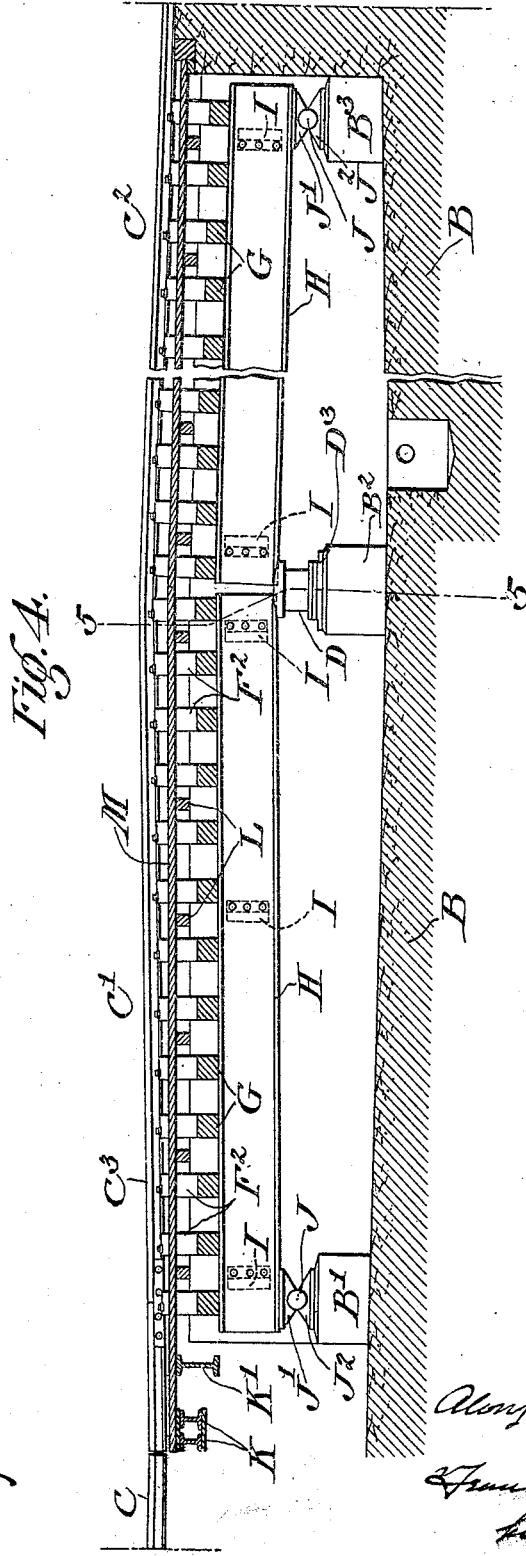

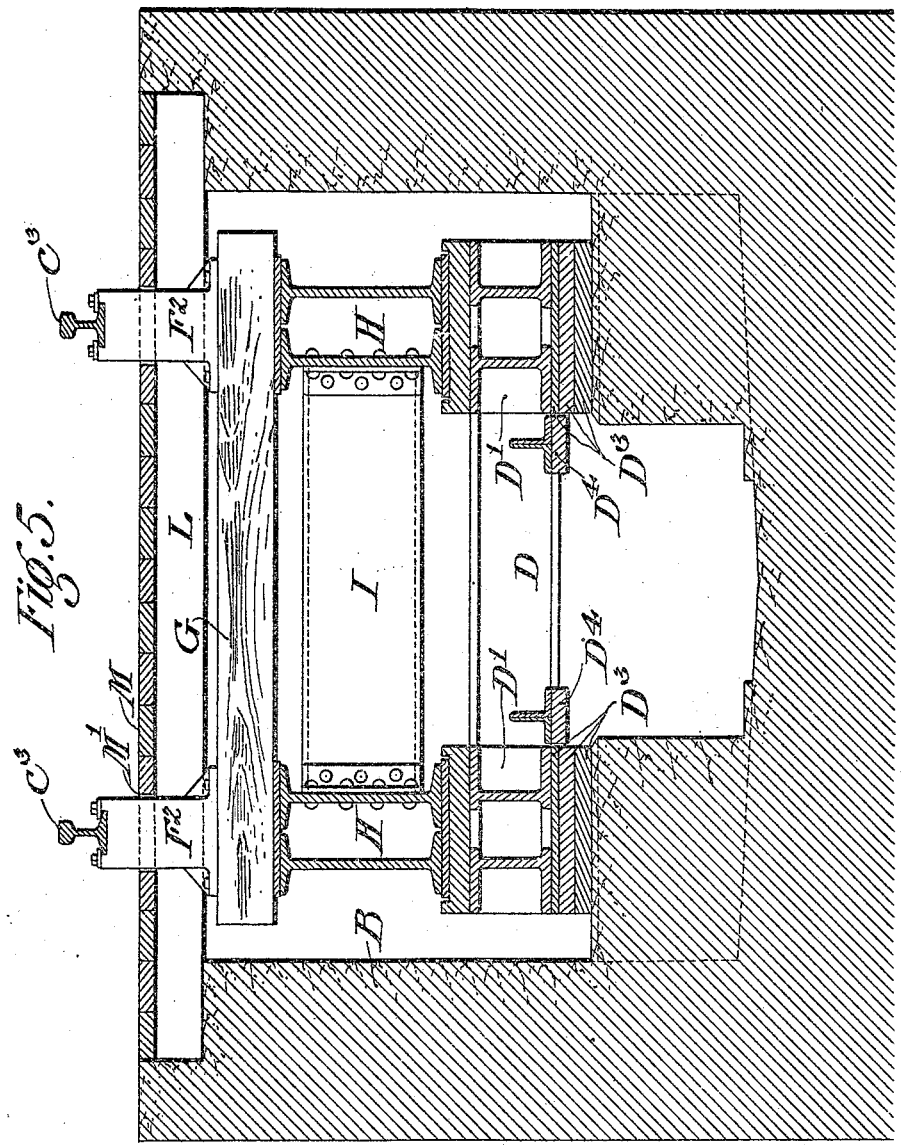

A. W. EPRIGHT.
CAR WEIGHING APPARATUS.
APPLICATION FILED JULY 27, 1909.
956,323.
Patented Apr. 26, 1910.
4 SHEETS—SHEET 4.
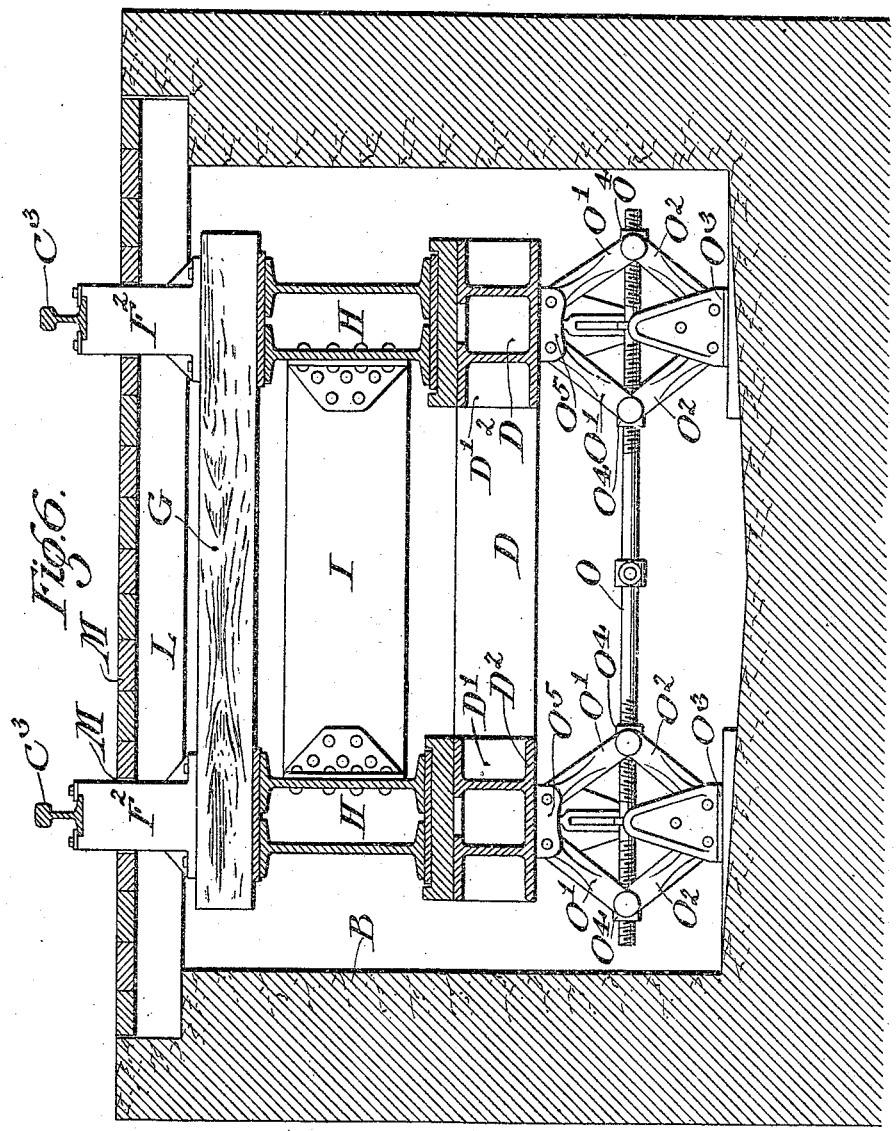

UNITED STATES PATENT OFFICE.

ALONZO W. EPRIGHT, OF ALTOONA, PENNSYLVANIA, ASSIGNOR OF ONE-HALF TO HIMSELF, AND ONE-HALF TO AXEL S. VOGT, OF PHILADELPHIA, PENNSYLVANIA.

CAR-WEIGHING APPARATUS.

956,323.  Specification of Letters Patent.  Patented Apr. 26, 1910.

Application filed July 27, 1909. Serial No. 509,862.

*To all whom it may concern:*

Be it known that I, ALONZO W. EPRIGHT, a citizen of the United States of America, residing in Altoona, in the county of Blair, State of Pennsylvania, have invented a certain new and useful Improvement in Car-Weighing Apparatus, of which the following is a true and exact description, reference being had to the accompanying drawings, which form a part thereof.

My present invention relates to apparatus for weighing railway cars, and particularly to the means employed for delivering the cars to the platform of the weighing scale.

The object of the invention is the provision of simple and effective means whereby with a minimum of attendance for, and skill in, manipulating the cars, the latter may be passed, rapidly and without stoppage, over the platform of the weighing scale with the proper velocities to permit each car to be weighed as it passes over the scale platform, regardless of variations, within the usual limits, in the lengths of successive cars. To accomplish this, I provide the track, over which the cars pass to the scale platform, with a hump having a fixed apex at a short distance from the adjacent edge of the scale platform, and I so proportion the slope at the side of the hump adjacent the scale to the distance of the apex from the scale platform and the rate at which it is desired to weigh the cars, that when the cars are pushed at a uniform rate up the side of the hump remote from the scale, and are uncoupled from each other, before, or while being pushed up the hump, each car will run down the hump and on to the scale platform with the proper velocity to permit it to be accurately weighed.

It is a matter of common knowledge that the cars passing over a railway scale are not of one pattern, and in particular that the distances between the front and rear wheels vary in different cars, but with my invention this variation in wheel base length is automatically compensated for. When the side of the hump adjacent the scale platform is short, (as it should be) the increase in velocity acquired by the cars running down that side of the hump varies inversely with the length of the wheel base of the car, other things being equal. This is as it should be, for the interval in which a moving car may be weighed is that between the time when the rear wheels pass on to the platform and the time when the front wheels pass off, and in order to keep this interval down to the desired minimum, cars having a long wheel base should move more slowly across the scale platform than cars having a shorter wheel base. For rapid and accurate weighing, it is desirable to have the scale platform and the adjacent side of the hump as short as possible, and in practice I prefer to make the side of the hump adjacent the scale platform about equal to the distance between the centers of the wheel trucks of the cars having the shortest weel base.

Preferably I construct the hump so that the elevation of its apex above the scale platform can be adjusted in order to get the desired relations insuring proper rates of movement of the cars on to the scale platform. For instance, the elevation of the hump required in a given installation depends upon and changes with the seasons. In the winter, when everything is taut from contraction the apex of the hump should be several inches higher than in the summer time when the cars form less rigid structures. I am, of course, familiar with the fact that it is common railway practice to provide humps in switch yards to facilitate the distribution of cars, but so far as I am aware, I am the first to provide a hump in the track running to a scale platform having its apex at a fixed and determined distance from the scale platform; am the first to provide a hump structure of such a character that the slope of the hump and the location of its apex will not be changed in time either by the cars which pass over the hump, forcing the cross ties down in the ballast, or in the repairing of the road bed and track by the track men; and am the first to provide a hump structure in which the elevation of the apex of the hump can be definitely adjusted as desired.

The various features of novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated and described apparatus in which the invention may be embodied.

Of the drawings, Figure 1 is a diagrammatic elevation showing a scale, track hump and a car having a short wheel base passing over the hump onto the scale platform. Fig. 2 is a view, similar to Fig. 1, but showing a car having a wheel base of medium length passing to the scale platform. Fig. 3 is a view, similar to Figs. 1 and 2, but showing a car having a long wheel base passing to the scale platform. Fig. 4 is a longitudinal sectional elevation through the hump. Fig. 5 is a transverse sectional elevation taken on the line 5—5 of Fig. 4, and Fig. 6 is a view taken similarly to Fig. 5, illustrating a modified construction.

In the drawings, and referring first to Figs. 1, 2 and 3, A represents the scale; B the wall of the scale pit, the bottom of which is shown as horizontal; C the track section supported by the scale platform; C' the track section of the side of the hump adjacent the scale platform; and $C^2$ the track section at the side of the hump remote from the scale. In each of these figures a car is shown, the front truck F of which has just passed from the hump onto the scale platform. The distances between the front and rear trucks, F and F' respectively, of the three cars E', $E^2$ and $E^3$ shown in Figs. 1, 2, and 3, respectively, are different, the wheel base of the car E' being shorter, and the wheel base of the car $E^3$ being longer, than the wheel base of the car $E^2$. Each of the cars E', $E^2$ and $E^3$ is uncoupled from its pusher; the uncoupling may advantageously be accomplished when the cars are being pushed up the inclined track section $C^2$. It will be apparent from an inspection of these drawings in connection with what has already been said, that the velocity of the car E' in passing over the scale will be greater, and the velocity of the car $E^3$ will be less than the velocity of the car $E^2$ in passing over the track section C if we assume that the velocities of the cars E, which have pushed the cars E', $E^2$ and $E^3$ up the hump, are the same, and that other conditions are the same in the different figures. It will also be apparent that with a given velocity of movement both trucks F and F' of car E' will be on the scale platform a longer time than will both trucks of the car $E^2$, and that both trucks of the car $E^2$ will be on the scale platform longer than will both trucks of the car $E^3$, and that when the inclination and length of the track section C' are properly chosen with respect to the suitable velocity of movement of the pushers E, the periods during which the front and rear trucks of each of the cars E', $E^2$ and $E^3$ are on the scale platform may be made substantially equal. This equality of weighing periods may be obtained also without requiring the setting of the brakes or other attention on the part of operatives.

The preferred form of construction of the hump which I employ, in order to maintain the distance between the apex of the hump and the scale platform constant in a simple, reliable and effective manner, and at the same time to provide suitable means for adjusting the apex of the hump vertically, is illustrated in Figs. 4, 5 and 6. The track rails $C^3$, proper, pertaining to the hump structure are supported on chairs $F^2$ which in turn are mounted on the usual cross ties G. The cross ties G for the hump section C' are supported on the upper edges of beams H which, in the form shown, are built up beams made of rolled metal shapes, and these beams are tied together by cross braces I. The lower ends of the beams H pertaining to the hump section C' are pivotally supported at J through hinge members J' and $J^2$, the hinge members J' being connected to the beams H and the hinge members $J^2$ being supported by abutments B' rising from the bottom of an extension of the scale pit B. The lower end of the hump section $C^2$ is pivotally supported in a similar manner. The upper ends of the beams H of the two hump sections C' and $C^2$ rest upon an adjustable support D which is mounted in the form shown in Figs. 4 and 5 on an abutment $B^2$. It will be understood of course that the abutments $B^2$ are beneath the apex of the hump, and in the usual form of my invention are located about midway between the abutments B' and $B^3$.

In the form of the apparatus shown in Figs. 4 and 5, the adjustable support D comprises a beam D', having enlarged end portions $D^2$. Spacers $D^3$ support the end portions $D^2$ and rest on abutment $B^2$ and these spacers may be increased in number or may be replaced by others of different thickness in order to give the desired vertical adjustment. The beam D' is provided with ears $D^4$ under which the tops of jacks, not shown, may be placed in order to raise and lower the member $D^2$ to permit the spacing blocks $D^3$ to be adjusted. $D^4$ represent seats which may be provided for the jacks.

The ends of the track rails $C^3$ adjacent the scale platform may be supported on stationary cross beams K and K'. The chairs F project through apertures M' in a stationary platform M which is supported by suitable beams L.

The means for adjusting the elevation of the apex of the hump, shown in Figs. 4 and 5, have been found quite satisfactory, for it will be understood that under certain conditions of use at least, the adjustment required is needed only at comparatively long intervals. Where it is desired, however, an adjusting mechanism may be provided in which no separate jacks are needed, and such a mechanism is shown in Fig. 6, where the upper members $O^5$, of the pair of jacks O, are permanently secured beneath the ends D² of the cross beam D', and the links O' and O², connecting the top member O⁵ with the base O³ of each jack are provided with nuts O⁴ in the usual manner receiving the threaded ends of the common cross bar O by means of which each pair of links O' and O² may be moved toward and away from the position in which they are alined in the usual manner of operating toggle jacks.

While, in accordance with the provisions of the statutes, I have illustrated and described the best forms, now known to me, in which the invention may be embodied, it will be obvious to those skilled in the art that many changes may be made in the form and arrangement of the apparatus disclosed without departing from the spirit of my invention, and it will be also understood that certain features of the invention disclosed may be used in some cases without a corresponding use of other features.

Having now described my invention, what I claim as new, and desire to secure by Letters Patent, is:

1. Car weighing apparatus, comprising in combination, a scale, a track leading thereto, and means for maintaining a hump therein, having its apex at a determined distance from, and at a determined elevation above, the adjacent edge of the scale.

2. Car weighing apparatus, comprising in combination, a scale, a track leading thereto, means for maintaining a hump therein, having its apex at a determined distance from, and at a determined elevation above, the adjacent edge of the scale, and means for varying the elevation of the apex of the hump.

3. Car weighing apparatus, comprising in combination, a scale, a track leading thereto, and a support for the portion of said track immediately adjacent said scale, comprising an unyielding foundation and a metal structure mounted thereon and having the portion adjacent the scale downwardly inclined toward the scale, and the portion more remote from the scale downwardly inclined away from the scale.

4. Car weighing apparatus, comprising in combination, a scale, a track leading thereto, and a support for the portion of said track immediately adjacent said scale, comprising an unyielding foundation and a metal structure mounted thereon, and having the portion adjacent the scale downwardly inclined toward the scale and the portion more remote from the scale downwardly inclined away from the scale, and means for vertically adjusting the adjacent ends of said two portions.

5. Car weighing apparatus, comprising in combination, a scale, a track leading thereto, and a support for the portion of said track immediately adjacent said scale, comprising an unyielding foundation and a metal structure mounted thereon, and having the portion adjacent the scale downwardly inclined toward the scale and the portion more remote from the scale downwardly inclined away from the scale, hinge connections between the two ends of said structure and said foundation, and means for vertically adjusting the adjacent ends of said two portions of said structure.

ALONZO W. EPRIGHT.

Witnesses:
Arnold Katz,
D. Stewart.